US010738751B2

(12) United States Patent
Komatsu et al.

(10) Patent No.: US 10,738,751 B2
(45) Date of Patent: Aug. 11, 2020

(54) FLUID CONTROL DEVICE FOR INTERNAL COMBUSTION ENGINE

(71) Applicant: HONDA MOTOR CO., LTD., Tokyo (JP)

(72) Inventors: Shota Komatsu, Wako (JP); Takayuki Kikuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/274,488

(22) Filed: Feb. 13, 2019

(65) Prior Publication Data

US 2019/0257278 A1   Aug. 22, 2019

(30) Foreign Application Priority Data

Feb. 20, 2018   (JP) .................................. 2018-028203

(51) Int. Cl.
*F02M 63/00* (2006.01)
*F02M 25/08* (2006.01)
(Continued)

(52) U.S. Cl.
CPC ...... *F02M 63/0015* (2013.01); *F02M 25/089* (2013.01); *F02M 25/0836* (2013.01);
(Continued)

(58) Field of Classification Search
CPC ........... F02M 25/0836; F02M 25/0872; F02M 25/089; F02M 2025/0845; F02M 63/0064
(Continued)

(56) References Cited

U.S. PATENT DOCUMENTS 5,353,770 A * 10/1994 Osanai .................. F02D 41/004
123/520
6,202,632 B1 * 3/2001 Geiger ............... F02M 25/0836
123/519
(Continued)

FOREIGN PATENT DOCUMENTS

DE            434232 A1   3/1996
DE   20 2009 001 691 U1   4/2009
(Continued)

OTHER PUBLICATIONS

Office Action dated Oct. 22, 2019, issued in counterpart DE Application No. 10 2019 201 961.7. (9 pages).
(Continued)

*Primary Examiner* — Sizo B Vilakazi
*Assistant Examiner* — Anthony L Bacon
(74) *Attorney, Agent, or Firm* — Westerman, Hattori, Daniels & Adrian, LLP

(57) ABSTRACT

A fluid control device for an internal combustion engine, includes: plural fluid control valves each including a chamber, a first port via which fluid is introduced to the chamber, a second port via which fluid is guided out from the chamber, and a solenoid valve part opening and closing the second port with respect to the chamber; one support member for supporting and fixing the fluid control valves to a vehicle; and a branched passage having plural inlet portions communicating with the second port of the fluid control valves and an outlet portion guiding out the fluid introduced from the inlet portions, the branched passage being formed integrally with an interior of the support member. Thus, due to the branched passage being formed from the support member itself without requiring a joint member having a special shape, it is possible to cut the number of components and save installation space.

8 Claims, 13 Drawing Sheets

(51) Int. Cl.
*F02M 57/02* (2006.01)
*F02M 47/02* (2006.01)

(52) U.S. Cl.
CPC ...... *F02M 25/0872* (2013.01); *F02M 57/027* (2013.01); *F02M 63/0064* (2013.01); *F02M 47/027* (2013.01); *F02M 2025/0845* (2013.01); *F02M 2200/70* (2013.01)

(58) Field of Classification Search
USPC .......................................................... 123/519
See application file for complete search history.

(56) References Cited

U.S. PATENT DOCUMENTS

| | | | |
|---|---|---|---|
| 6,439,206 B1 * | 8/2002 | Shimamura | F02M 25/0836 123/516 |
| 6,672,291 B2 * | 1/2004 | Balsdon | F02M 25/0809 123/519 |
| 9,909,538 B2 | 3/2018 | Ghannam et al. | |
| 2003/0197143 A1 * | 10/2003 | Kai | F02M 25/0836 251/129.17 |
| 2006/0113431 A1 * | 6/2006 | Honermann | A01C 23/008 248/65 |
| 2013/0042839 A1 | 2/2013 | Takahashi et al. | |
| 2014/0345709 A1 | 11/2014 | Jefford et al. | |
| 2018/0171939 A1 * | 6/2018 | Watanabe | F02M 25/08 |

FOREIGN PATENT DOCUMENTS

| | | |
|---|---|---|
| JP | 6-272628 A | 9/1994 |
| JP | 2014-58879 A | 4/2014 |
| JP | 5717876 B2 | 5/2015 |
| WO | 2008/090657 A1 | 7/2008 |
| WO | 2012/025958 A1 | 3/2012 |

OTHER PUBLICATIONS

Allowance dated Jun. 26, 2019, issued in counterpart JP Application No. 2018-028203. (3 pages).

* cited by examiner

FRONT

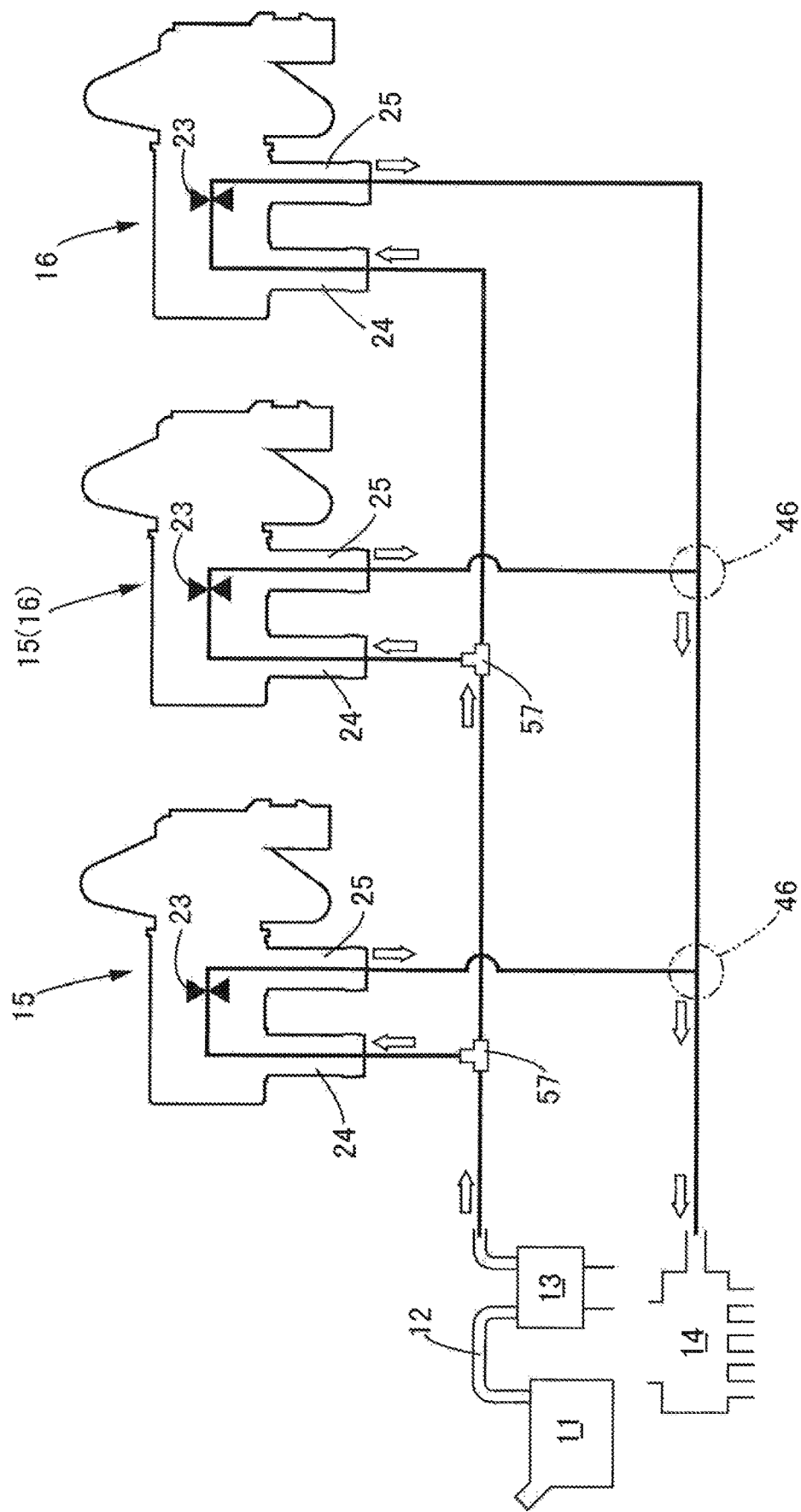

FLUID CONTROL DEVICE FOR INTERNAL COMBUSTION ENGINE

BACKGROUND OF THE INVENTION

Field of the Invention

The present invention relates to a fluid control device for an internal combustion engine that can freely control the flow rate of a fluid by a plurality of fluid control valves.

Description of the Related Art

An arrangement is known from Japanese Patent No. 5717876 in which a canister charged with fuel vapor generated within a fuel tank of an automobile equipped with an internal combustion engine and an air intake manifold of the internal combustion engine are connected via a purge passage, two purge control solenoid valves (hereinafter, called PCSVs) are disposed in parallel in the purge passage, and the fuel vapor charged in the canister is supplied to the air intake manifold by opening one or both of the PCSVs, burned in the internal combustion engine, and thus prevented from being dissipated to the atmosphere.

In the conventional arrangement, no consideration is given to the structure with which the two PCSVs are mounted; in order to mount them on the internal combustion engine not only is it necessary to use a bracket for mounting, but it is also necessary to use a trifurcate branched passage for combining two purge passages extending from the two PCSVs into one purge passage and connecting them to the air intake manifold. Therefore, a special design is required to make it compact in order to lay out the two PCSVs and piping of the purge passages within a confined engine compartment.

SUMMARY OF THE INVENTION

The present invention has been accomplished in light of the above circumstances, and it is an object thereof to form in a compact manner a support member for supporting a plurality of fluid control valves and a branched passage connected to the plurality of fluid control valves.

In order to achieve the object, according to a first aspect of the present invention, there is provided a fluid control device for an internal combustion engine, the fluid control device comprising: a plurality of fluid control valves each comprising a chamber, a first port via which fluid is introduced to the chamber, a second port via which fluid is guided out from the chamber, and a solenoid valve part opening and closing the second port with respect to the chamber; one support member for supporting and fixing the plurality of fluid control valves to a vehicle; and a branched passage having a plurality of inlet portions communicating with the second port of the plurality of fluid control valves and an outlet portion guiding out the fluid introduced from the plurality of inlet portions, the branched passage being formed integrally with an interior of the support member.

In accordance with the first aspect, since there are provided the plurality of fluid control valves including the chamber, the first port via which fluid is introduced to the chamber, the second port via which fluid is guided out from the chamber, and the solenoid valve part opening and closing the second port with respect to the chamber; said one support member for supporting and fixing the plurality of fluid control valves to a vehicle; and the branched passage having the plurality of inlet portions communicating with the second port of the plurality of fluid control valves and the outlet portion guiding out the fluid introduced from the plurality of inlet portions; and the branched passage is formed integrally with the interior of the support member, it is possible, by opening the solenoid valve part of any number of the fluid control valves among the plurality of fluid control valves to thus provide communication between the first port and the second port, to freely control the flow rate of fluid guided out from the outlet portion of the branched passage. Moreover, due to the branched passage where fluid guided out from the plurality of second ports opened by means of the solenoid valve part is combined being formed from the support member itself without requiring a joint member having a special shape, not only is it possible to cut the number of components and save installation space, but it is also possible to suppress the possibility of the branched passage being damaged and fluid leaking when the vehicle is involved in a collision.

According to a second aspect of the present invention, in addition to the first aspect, at least one of the plurality of fluid control valves comprises a third port guiding out fluid from the chamber, the third port communicating with the first port of another of the plurality of fluid control valves.

In accordance with the second aspect, since at least one of the plurality of fluid control valves includes the third port guiding out fluid from the chamber, and the third port communicates with the first port of another of the plurality of fluid control valves, due to the chamber of at least one fluid control valve exhibiting the function of the joint member of the branched part distributing the fluid between the first ports of the plurality of fluid control valves, it is possible to eliminate the need for the joint member and the piping connected thereto, thus enabling the number of components to be cut.

According to a third aspect of the present invention, in addition to the first aspect, at least one of the plurality of fluid control valves comprises an O ring that is fitted into an annular groove formed in an outer periphery of the second port, and the second port is fitted into one of the inlet portions of the branched passage via the O ring.

In accordance with the third aspect, since at least one of the plurality of fluid control valves includes the O ring, which is fitted into the annular groove formed in the outer periphery of the second port, and the second port is fitted into said one inlet portion of the branched passage via the O ring, it is possible to eliminate the need for piping connecting the second port to one inlet portion of the branched passage and prevent fluid from leaking via a connecting part where the second port is connected to one inlet portion of the branched passage.

According to a fourth aspect of the present invention, in addition to the third aspect, another of the inlet portions of the branched passage and the outlet portion of the branched passage comprise a joint member.

In accordance with the fourth aspect, since said other inlet portion of the branched passage and the outlet portion of the branched passage include the joint member, it becomes easy to connect the piping to said other inlet portion and the outlet portion of the branched passage.

According to a fifth aspect of the present invention, in addition to the third aspect, at least one of the plurality of fluid control valves is fixed to the support member by means of a stud bolt, a center line of the stud bolt being disposed in parallel with a center line of the second port having the O ring.

In accordance with the fifth aspect, since at least one of the plurality of fluid control valves is fixed to the support member by means of the stud bolt, and the center line of the stud bolt is disposed in parallel with the center line of the second port having the O ring, it is possible, by fixing the fluid control valve to the support member by means of the stud bolt, to position the second port with respect to the support member with good precision and reliably prevent fluid from leaking past the O ring provided on the second port.

According to a sixth aspect of the present invention, in addition to the second aspect, a housing having the chamber of the fluid control valves formed in an interior of the housing is joined to the solenoid valve part, the solenoid valve part operates in a same direction as a longitudinal direction of the housing, two of the fluid control valves are disposed side by side, when viewed in an operating direction of the solenoid valve part of any one of the fluid control valves the support member extends along a direction in which the two fluid control valves are arranged side by side and holds the fluid control valves, and the first port, the second port, and the third port of the two fluid control valves are disposed within a region sandwiched by the support member and a straight line joining positions where each of the fluid control valves projects farthest from the support member.

In accordance with the sixth aspect, since the housing having the chamber of the fluid control valves formed in the interior thereof is joined to the solenoid valve part, the solenoid valve part operates in the same direction as the longitudinal direction of the housing, two of the fluid control valves are disposed side by side, when viewed in the operating direction of the solenoid valve part of any one of the fluid control valves the support member extends along the direction in which the two fluid control valves are arranged side by side and holds the fluid control valves, and the first port, the second port, and the third port of the two fluid control valves are disposed within the region sandwiched by the support member and the straight line joining positions where each of the fluid control valves projects the farthest from the support member, it is possible to suppress the depth of the assembly of the two fluid control valves and the support member and dispose it on the internal combustion engine in a compact manner.

According to a seventh aspect of the present invention, in addition to the first aspect, the solenoid valve parts of the two fluid control valves have their operating directions orthogonal to each other when viewed from one direction, and when a plane perpendicular to the orthogonal plane is viewed from above the two fluid control valves are disposed side by side, the support member extends along the direction in which the two fluid control valves are arranged side by side and holds the fluid control valves, and piping providing a connection between the two fluid control valves is disposed in a region surrounded by an extension line of a side face, on a side distant from the two fluid control valves, of the housing of the two fluid control valves along the direction in which the two fluid control valves are arranged side by side and an extension line of a side face, on a side distant from the two fluid control valves, of the housing along a direction orthogonal to the direction in which the two fluid control valves are arranged side by side.

In accordance with the seventh aspect, since the solenoid valve parts of the two fluid control valves have their operating directions orthogonal to each other when viewed from one direction, and when the plane perpendicular to the orthogonal plane is viewed from above the two fluid control valves are disposed side by side, the support member extends along the direction in which the two fluid control valves are arranged side by side and holds the fluid control valves, and piping providing a connection between the two fluid control valves is disposed in the region surrounded by the extension line of the side face, on the side distant from the two fluid control valves, of the housing of the two fluid control valves along the direction in which the two fluid control valves are arranged side by side and the extension line of the side face, on the side distant from the two fluid control valves, of the housing along a direction orthogonal to the direction in which the two fluid control valves are arranged side by side, it is possible to dispose the piping in a compact manner in the region sandwiched by the two fluid control valves, thus enabling installation space to be saved.

According to an eighth aspect of the present invention, in addition to the second aspect, the solenoid valve parts of the two fluid control valves have their operating directions orthogonal to each other when viewed from one direction, when a plane perpendicular to the orthogonal plane is viewed from above, the two fluid control valves are disposed side by side, the third port of the one fluid control valve and the first port of the another fluid control valve, which extend in a direction orthogonal to each other, are connected by first piping, the second port of the another fluid control valve is disposed in parallel with the first port on the respective solenoid valve part side with respect to the first port, the second port of the another fluid control valve and the inlet portion of the one fluid control valve are connected by second piping, and the first piping and the second piping intersect each other.

In accordance with the eighth aspect, since the solenoid valve parts of the two fluid control valves have their operating directions orthogonal to each other when viewed from one direction, when the plane perpendicular to the orthogonal plane is viewed from above, the two fluid control valves are disposed side by side, the third port of the one fluid control valve and the first port of the another fluid control valve, which extend in the direction orthogonal to each other, are connected by the first piping, the second port of the another fluid control valve is disposed in parallel with the first port on the respective solenoid valve part side with respect to the first port, the second port of the another fluid control valve and the inlet portion of the one fluid control valve are connected by the second piping, and the first piping and the second piping intersect each other, it is possible to dispose the first and second pipings in a compact manner in the region sandwiched by the two fluid control valves, thus enabling installation space to be saved.

Note that a first PCSV 15 and a second PCSV 16 of embodiments correspond to the fluid control valves of the present invention, a bracket 41 of the embodiments corresponds to the support member of the present invention, a second PCSV-side inlet portion 41b and a first PCSV-side inlet portion 41c of the embodiments correspond to the inlet portions of the present invention, an air intake manifold-side outlet portion 41d of the embodiments corresponds to the outlet portion of the present invention, a second tube 49 of the embodiments corresponds to the piping or the first piping of the present invention, the third tube 51 corresponds to the piping or the second piping of the present invention, and a joint pipe 50 and a joint pipe 52 of the embodiments correspond to the joint member of the present invention.

The above and other objects, characteristics and advantages of the present invention will be clear from detailed descriptions of the preferred embodiments which will be provided below while referring to the attached drawings.

BRIEF DESCRIPTION OF THE DRAWINGS

FIG. 13 is a view showing an entire configuration of a purge control system of fuel vapor. (fourth embodiment)

DESCRIPTION OF THE PREFERRED EMBODIMENTS

First Embodiment

A first embodiment of the present invention is explained below by reference to FIG. 1 to FIG. 10.

Figure 1:
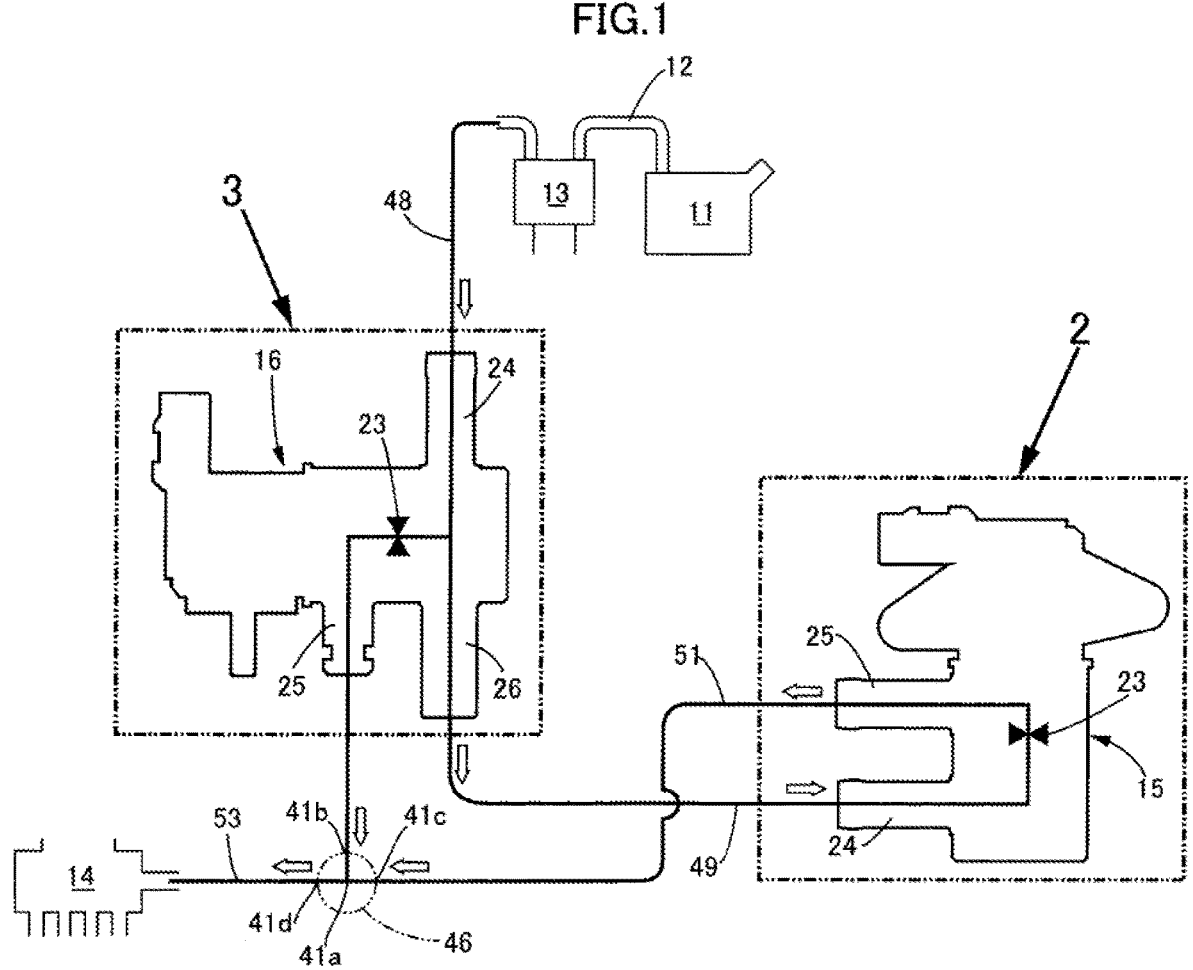
FIG. 1 is a view showing an entire configuration of a purge control system of fuel vapor. (first embodiment)

As shown in FIG. 1, a canister 13 is connected via a charge passage 12 to a fuel tank 11 of a hybrid vehicle employing an internal combustion engine and an electric motor as drive sources for traveling, the canister 13 being charged with fuel vapor generated in the interior of the fuel tank 11. A first PCSV (purge control solenoid valve) 15 and a second PCSV (purge control solenoid valve) 16 are disposed in parallel in a purge passage connecting the canister 13 and an air intake manifold 14 of the internal combustion engine, the fuel vapor with which the canister 13 is charged passes through the first PCSV 15 alone or passes through both the first PCSV 15 and the second PCSV 16, is supplied to the air intake manifold 14, is introduced therefrom to a combustion chamber of the internal combustion engine together with air taken in, and is provided for combustion.

Figure 2:
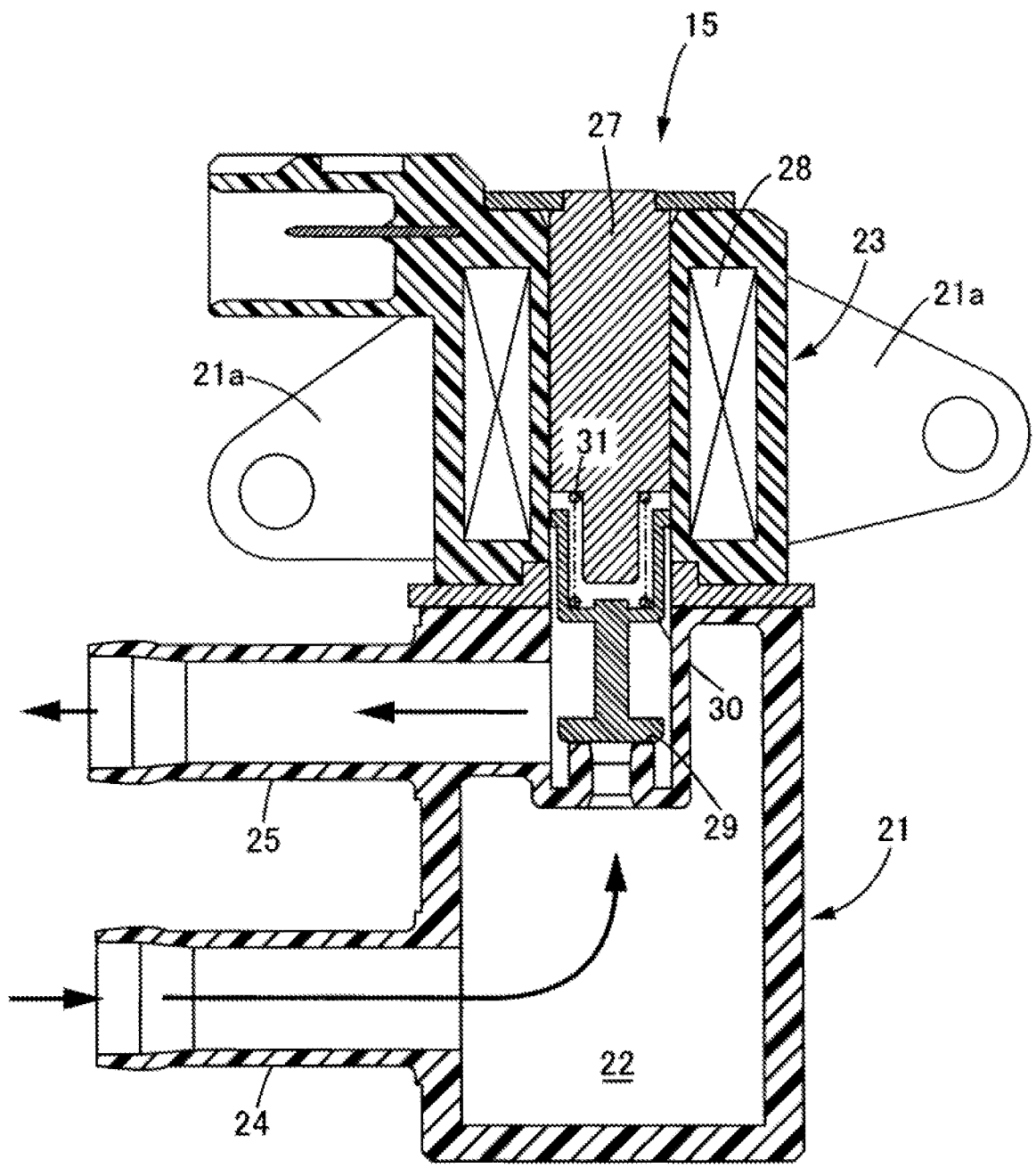
FIG. 2 is a longitudinal sectional view of a first PCSV. (first embodiment)

As shown in FIG. 2, the first PCSV 15 comprises a substantially cylindrical housing 21, a chamber 22 formed in the interior of the housing 21, and a solenoid valve part 23 connected to one end part of the housing 21. A first port 24 and second port 25 communicating with the chamber 22 protrude outward from the housing 21, communication between the first port 24 and the second port 25 being controlled by means of the solenoid valve part 23.

The solenoid valve part 23 includes a core 27, a coil 28 wound around the outer periphery of the core 27, a plunger 30 formed on the housing 21 and opposing a valve seat 29 as a partition between the chamber 22 and the second port 25, and a spring 31 urging the plunger 30 in a direction in which it is seated on the valve seat 29. When the coil 28 is de-energized, the plunger 30 urged by the spring 31 is seated on the valve seat 29, and communication between the chamber 22 and the second port 25 is cut off. When the coil 28 is energized, the plunger 30 attracted by the core 27 departs from the valve seat 29 against the resilient force of the spring 31, and communication is provided between the chamber 22 and the second port 25. It is possible, by controlling the current of the coil 28, to freely regulate the position of the plunger 30, that is, the degree of opening of the solenoid valve part 23.

Figure 3:
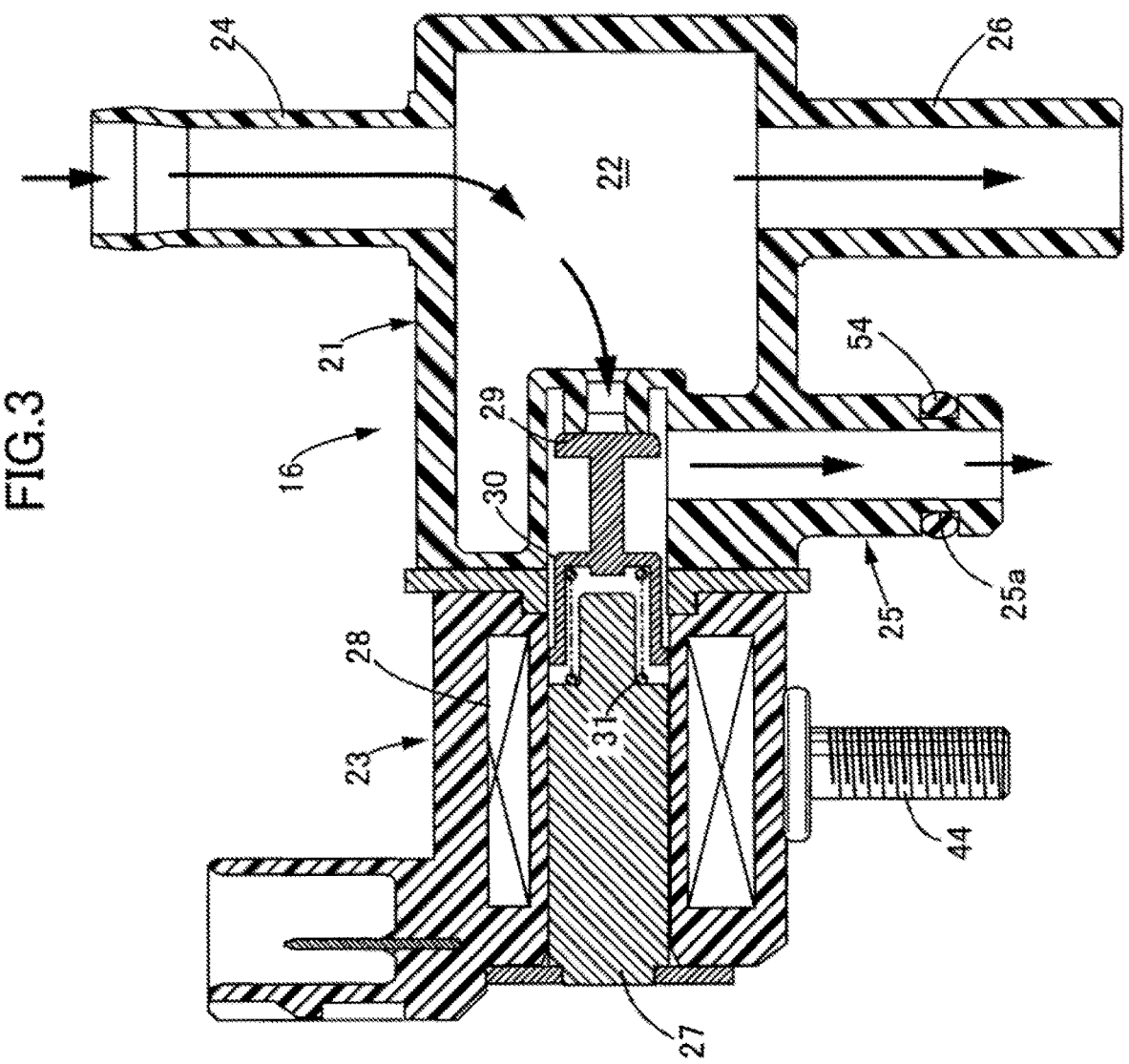
FIG. 3 is a longitudinal sectional view of a second PCSV. (first embodiment)

As shown in FIG. 3, the structure of the second PCSV 16 is substantially the same as the structure of the first PCSV 15 described above, but they are different in that the second PCSV 16 further includes a third port 26 communicating with the chamber 22 and projecting outward from the housing 21. The first port 24 and the third port 26 always communicate with each other via the chamber 22. Furthermore, the chamber 22 of the second PCSV 16 has the function of a trifurcate joint member that connects the first port 24, the second port 25, and the third port 26 to each other.

As shown in FIG. 4 to FIG. 8, the first PCSV 15 and the second PCSV 16 are mounted on the internal combustion engine via a single bracket 41. The bracket 41 is an aluminum alloy die cast member and is fastened to the internal combustion engine by means of two bolts 42. The first PCSV 15 is fixed to the bracket 41 by means of two bolts 43 extending through mounting portions 21a projecting from the housing 21 in a state in which the center line of the housing 21 is disposed in the up-down direction. The second PCSV 16 is fixed to the bracket 41 by means of a stud bolt 44 projecting downward from the housing 21 and a nut 45 screwed around the stud bolt 44 in a state in which the center line of the housing 21 is disposed in the horizontal direction.

A trifurcate branched passage 46 is formed integrally with the interior of the bracket 41. The branched passage 46 includes a communication portion 41a extending in the horizontal depth direction and having its open end blocked by a plug 47, a second PCSV-side inlet portion 41b extending in the up-down direction, having its upper end opening upward, and having its lower end communicating with the communication portion 41a, a first PCSV-side inlet portion 41c extending in the horizontal direction, having one end communicating with the communication portion 41a, and having the other end open, and an air intake manifold-side outlet portion 41d extending in the up-down direction, having its upper end communicating with the communication portion 41a, and having its lower end open.

A purge passage connecting the canister 13 and the air intake manifold 14 is formed from a first tube 48 connecting the canister 13 to the first port 24 of the second PCSV 16, a second tube 49 connecting the third port 26 of the second PCSV 16 to the first port 24 of the first PCSV 15, a third tube 51 connecting the second port 25 of the first PCSV 15 to a joint pipe 50 press fitted in the first PCSV-side inlet portion 41c of the branched passage 46 (see FIG. 8), and a fourth tube 53 connecting to the air intake manifold 14 a joint pipe 52 press fitted in the air intake manifold-side outlet portion 41d of the branched passage 46.

An O ring 54 (see FIG. 6 and FIG. 7) is fitted into an annular groove 25a formed in the outer periphery of the second port 25 of the second PCSV 16, and this 0 ring 54 seals the second port 25 of the second PCSV 16 with respect to an inner peripheral face of the second PCSV-side inlet portion 41b of the branched passage 46 of the bracket 41. The second port 25 of the second PCSV 16 and the stud bolt 44 are disposed in parallel with each other.

Figure 4:
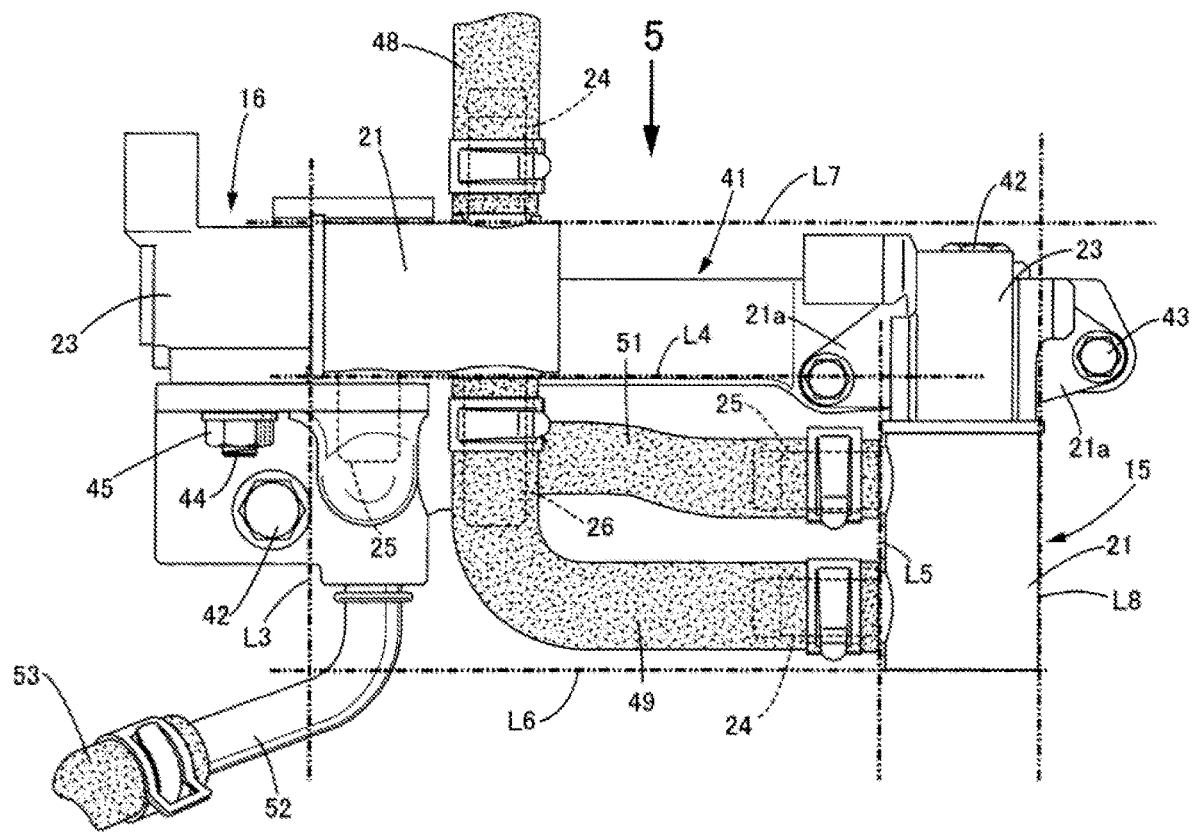
FIG. 4 is a side view of a purge control device. (first embodiment)
Figure 5:
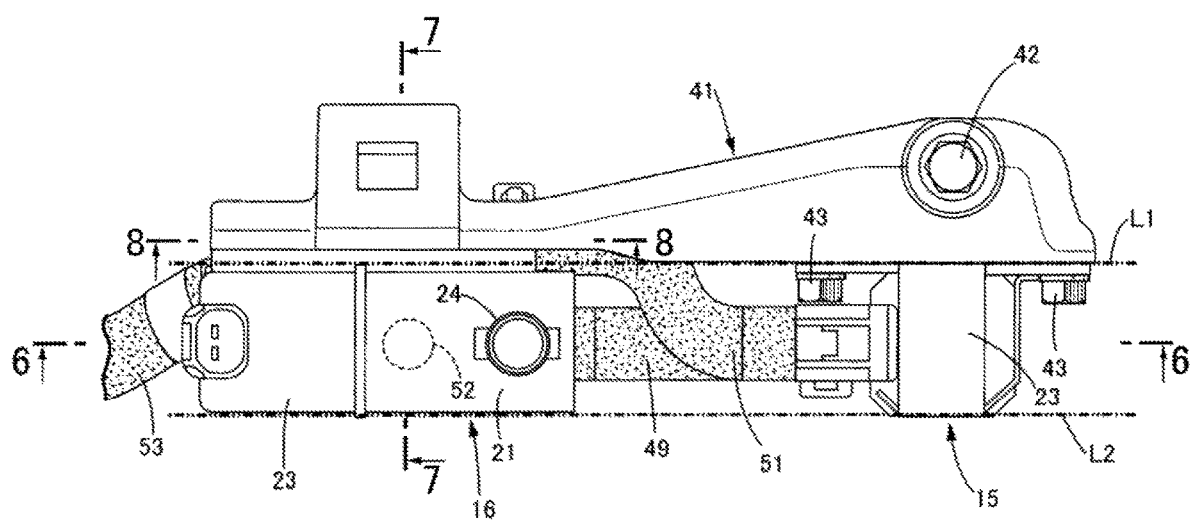
FIG. 5 is a view from a direction of arrow 5 in FIG. 4. (first embodiment)
Figure 6:
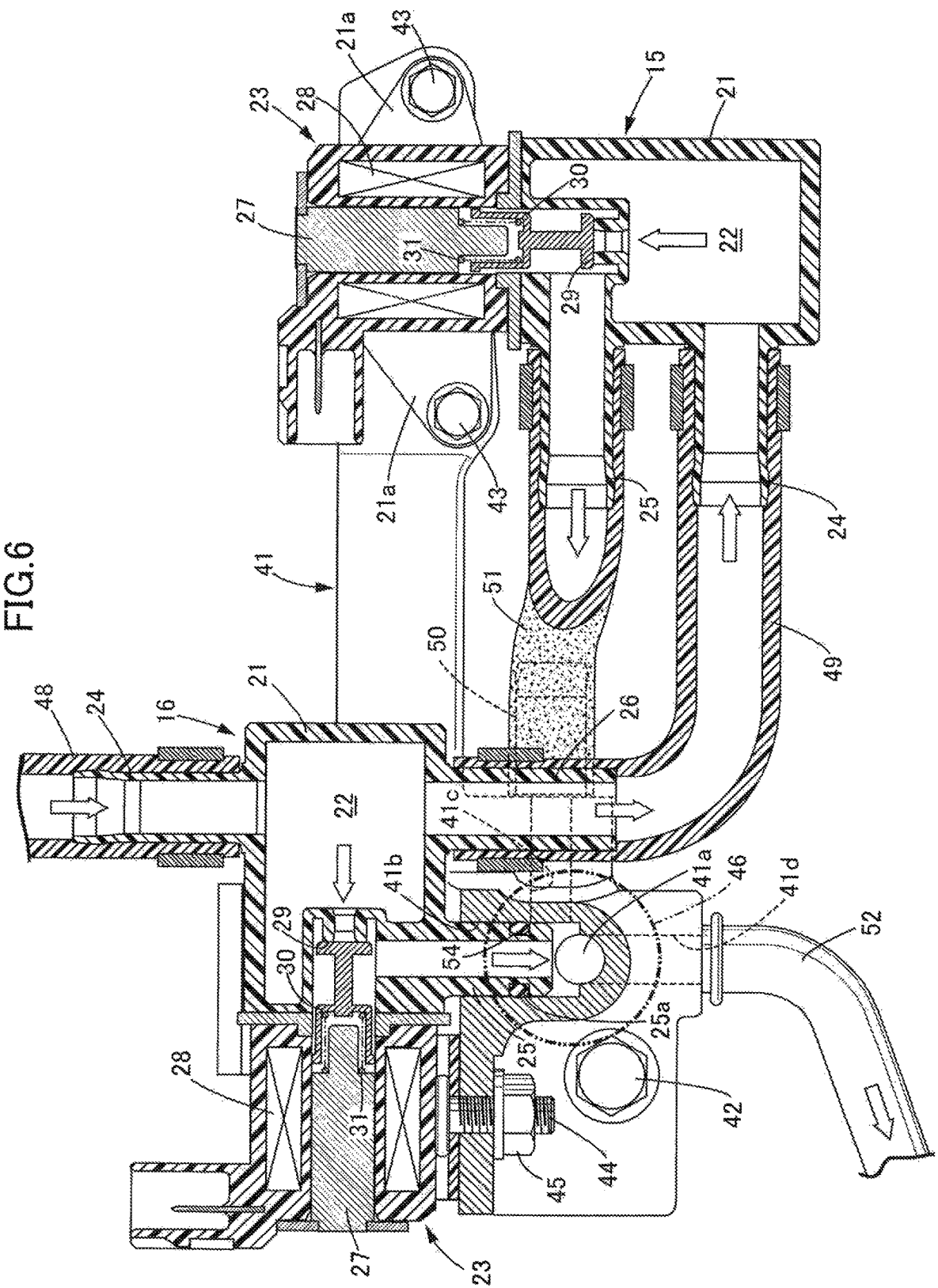
FIG. 6 is a sectional view along line 6-6 in FIG. 5. (first embodiment)
Figure 7:
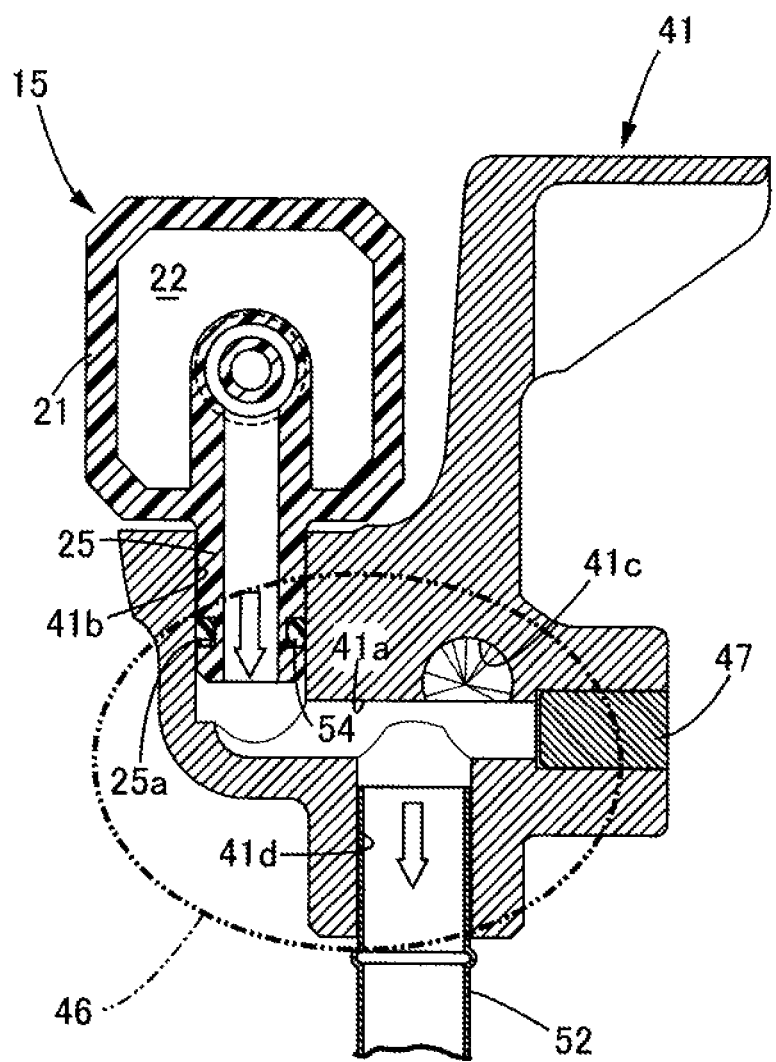
FIG. 7 is a sectional view along line 7-7 in FIG. 5. (first embodiment)
Figure 8:
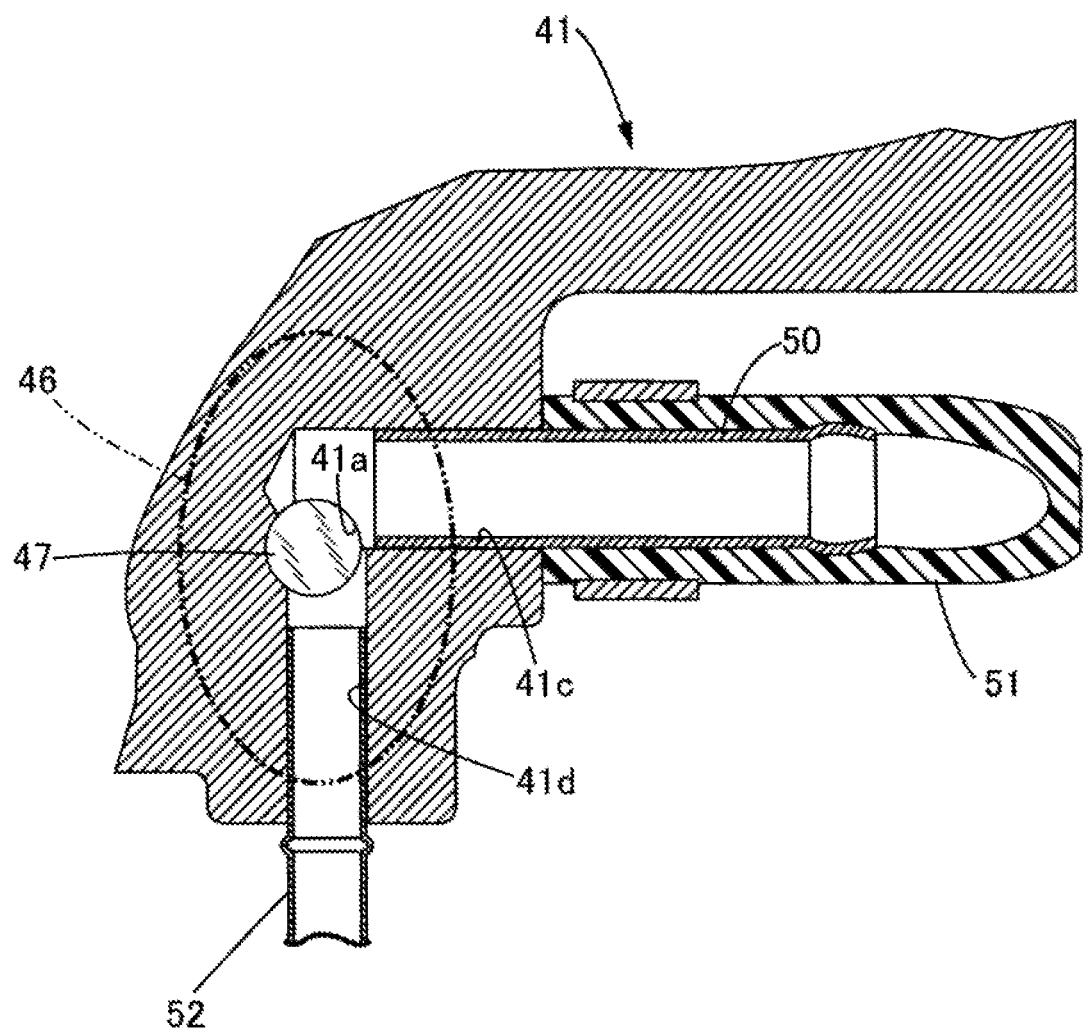
FIG. 8 is a sectional view along line 8-8 in FIG. 5. (first embodiment)

As is clear from FIG. 4 and FIG. 5, the first PCSV 15 and the second PCSV 16 are supported so as to project in one direction from a line L1 denoting one side face of the bracket 41 (see FIG. 5); when a line joining a position where the first PCSV 15 is the farthest from the line L1 of the bracket 41 and a position where the second PCSV 16 is the farthest from the line L1 of the bracket 41 is defined as L2 (see FIG. 5), the first port 24, second port 25, third port 26 of the first PCSV 15 and the first port 24 and second port 25 of the second PCSV 16 are disposed in a region sandwiched by the line L1 and the line L2.

Furthermore, the second tube 49 and the third tube 51, which connect the first PCSV 15 and the second PCSV 16, are disposed in a region bounded by a line L3, which is an extension line of a side face on the left side of the housing 21 of the second PCSV 16 (see FIG. 4), a line L4, which is an extension line of a side face on the lower side thereof (see FIG. 4), a line L5, which is an extension line of a side face on the left side of the housing 21 of the first PCSV 15 (see FIG. 4), and a line L6, which is an extension line of a side face on the lower side thereof (see FIG. 4). The first port 24 of the first PCSV 15 on the lower side and the second port 25 on the upper side are disposed so as to be in parallel with each other and be bent back, and the second tube 49 and the third tube 51 are disposed so as to intersect each other.

Figure 9:
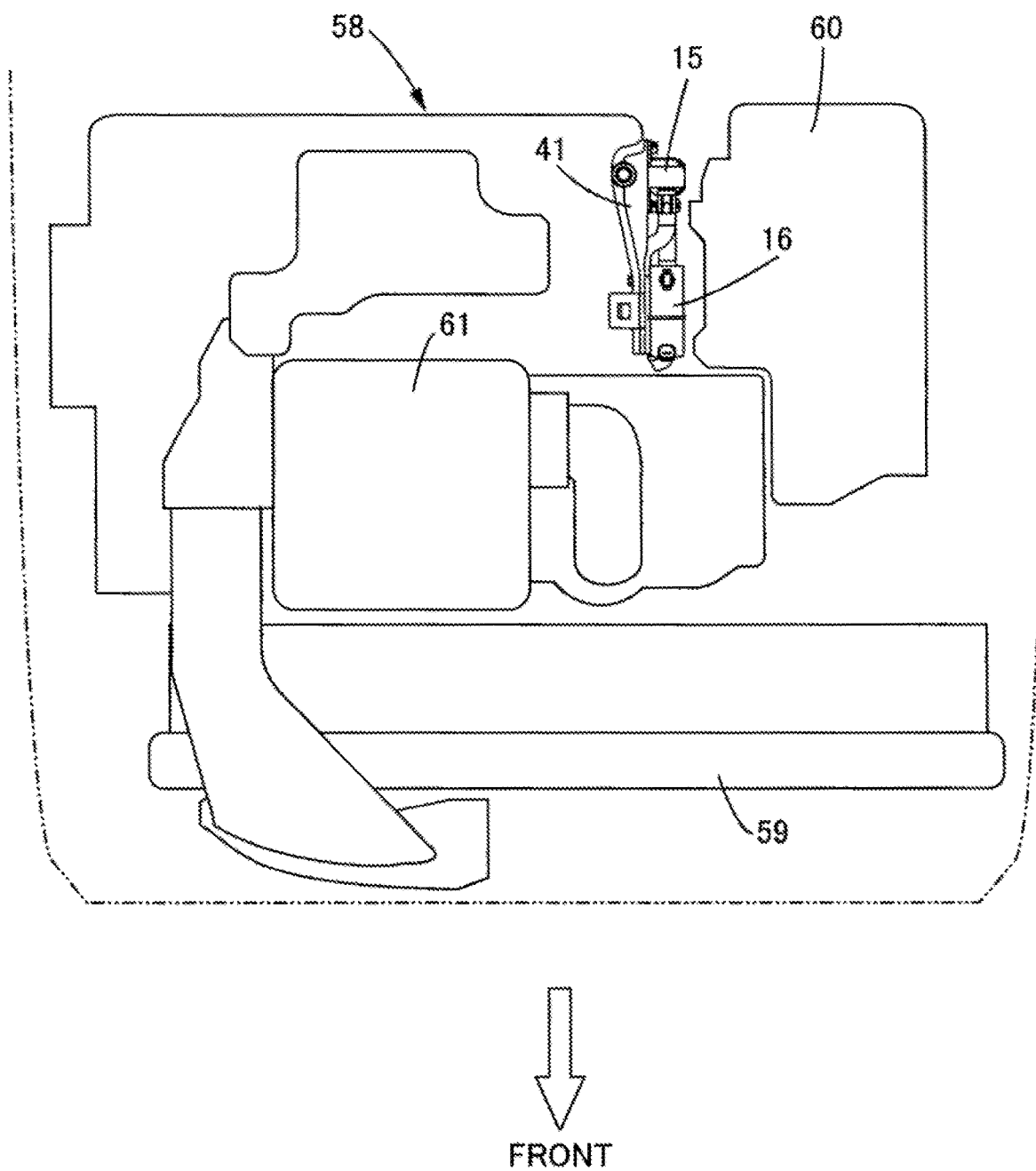
FIG. 9 is a plan view of an engine compartment (first embodiment)

As shown in FIG. 9, a power unit 58, in which a transmission is joined to the internal combustion engine and the electric motor as power sources for traveling, is mounted in a central part of the engine compartment, a radiator 59 is disposed in front of the power unit 58, a PDU (power drive unit) 60 for controlling the operation of the electric motor is disposed leftward of the power unit 58, and an air cleaner 61 is disposed above the power unit 58.

The operation of the embodiment of the present invention having the above arrangement is now explained.

When the solenoid valve part 23 of the first PCSV 15 is opened during running of the internal combustion engine, intake air negative pressure of the air intake manifold 14 causes flow from the canister 13 toward the air intake manifold 14, and fuel vapor purged from the canister 13 is supplied to the combustion chamber of the internal combustion engine via the path: canister 13→first tube 48→first port 24, chamber 22, and third port 26 of the second PCSV 16→second tube 49→first port 24, chamber 22, opened solenoid valve part 23, and second port 25 of the first PCSV 15→third tube 51→branched passage 46 of the bracket 41→fourth tube 53→air intake manifold 14, the fuel vapor being burned there together with intake air and being prevented from being dissipated to the atmosphere.

When a required purge flow rate cannot be met only by opening the solenoid valve part 23 of the first PCSV 15, in addition to the solenoid valve part 23 of the first PCSV 15, the solenoid valve part 23 of the second PCSV 16 opens, and part of the fuel vapor purged from the canister 13 is supplied to the combustion chamber of the internal combustion engine via the path: canister 13→first tube 48→first port 24, chamber 22, opened solenoid valve part 23, and second port 25 of the second PCSV 16→branched passage 46 of the bracket 41→fourth tube 53→air intake manifold 14, said part of the fuel vapor being burned there together with intake air and being prevented from being dissipated to the atmosphere. In this way, when the required purge flow rate is large, due to both the solenoid valve part 23 of the first PCSV 15 and the solenoid valve part 23 of the second PCSV 16, which are disposed in parallel, being opened, the required purge flow rate can be met.

Figure 10:
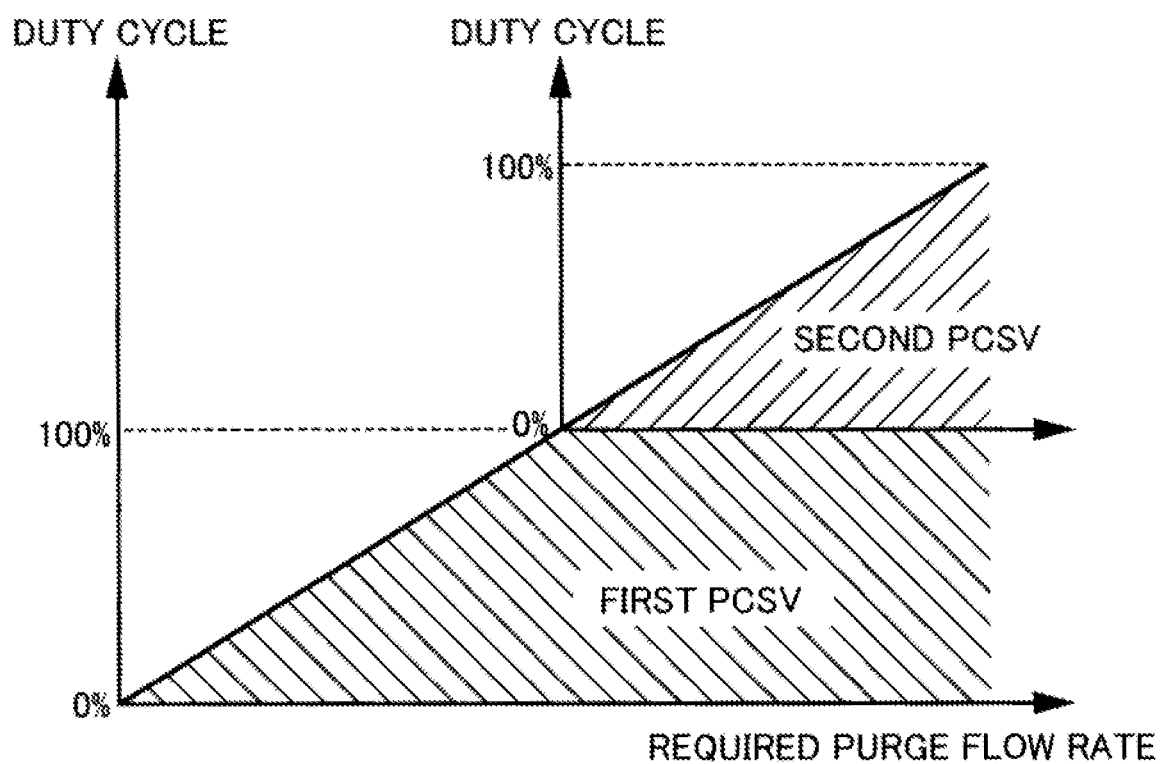
FIG. 10 is a graph showing a relationship between a required purge flow rate and duty cycles of the first PCSV and the second PCSV. (first embodiment)

As shown in FIG. 10, when the required purge flow rate increases from 0, first the duty cycle of the first PCSV 15 can be increased from 0% to 100% to thus continuously increase the purge flow rate, and when the duty cycle of the first PCSV 15 reaches 100% and the purge flow rate cannot be increased any further, while maintaining the duty cycle of the first PCSV 15 at 100%, increasing the duty cycle of the second PCSV 16 from 0% to 100% enables the purge flow rate to be continuously increased still further.

Since the frequency with which the internal combustion engine is run in a hybrid vehicle is smaller than that in a gasoline vehicle, a large purge flow rate is necessary during a limited period of running of the internal combustion engine; in order to obtain the purge flow rate if the dimensions of a PCSV are increased, there are the problems that due to an increase in the dimensions of the plunger 30 the response of the solenoid valve part 23 is delayed, and due to an increase in the gap between the plunger 30 and the valve seat 29 fluid leaks to thus degrade the control precision of the purge flow rate. However, in accordance with the present embodiment, disposing the first PCSV 15 and the second PCSV 16, which have relatively small dimensions, in parallel enables the control precision of the purge flow rate to be enhanced while ensuring that there is a large purge flow rate.

Fuel vapor flowing out from the second port 25 of the first PCSV 15 and fuel vapor flowing out from the second port 25 of the second PCSV 16 are combined in the branched passage 46 and supplied to the air intake manifold 14; if the branched passage 46 were formed from a trifurcate joint member, not only would the number of components be increased by a portion corresponding to the joint member, but it would also become necessary to ensure space for the installation thereof, and there is a possibility that it would become difficult to lay it out within a confined engine compartment. However, in accordance with the present embodiment, since the branched passage 46 is formed integrally with the interior of the bracket 41 for fixing the first PCSV 15 and the second PCSV 16 to the internal combustion engine, not only is it possible to eliminate the need for a special joint member, thus cutting the number of components, but it is also possible to achieve a reduction in the installation space and a cost saving.

Furthermore, since the third tube 51 is connected to the joint pipe 50 press fitted into the first PCSV-side inlet portion 41*c* of the branched passage 46, and the fourth tube 53 is connected to the joint pipe 52 press fitted into the air intake manifold-side outlet portion 41*d* of the branched passage 46, it becomes easy to connect the third tube 51 and the fourth tube 53.

Moreover, since the first port 24, the second port 25, and the third port 26 communicate with the chamber 22 of the second PCSV 16, and part of the fuel vapor flowing from the first port 24 to the chamber 22 is supplied to the first port 24 of the first PCSV 15 via the third port 26, it is possible to impart to the chamber 22 of the second PCSV 16 the function as a trifurcate joint member of distributing the fuel vapor coming out of the canister 13 between the first port 24 of the first PCSV 15 and the first port 24 of the second PCSV 16, thereby eliminating the use of a special joint member and achieving a decrease in the number of components, a reduction in the installation space, and a cost saving.

Furthermore, when mounting the second PCSV 16 on the bracket 41, it is possible, by positioning the second port 25 of the second PCSV 16 by fitting it into the second PCSV-side inlet portion 41*b* of the bracket 41, to firmly fix the second PCSV 16 with only one stud bolt 44. Moreover, since the second port 25 of the second PCSV 16 and the stud bolt 44 are disposed in parallel with each other, when fastening with the stud bolt 44 it is possible to prevent the O ring 54 from galling, thus enhancing the sealing properties.

Moreover, since the assembly of the bracket 41, the first PCSV 15, the second PCSV 16, and part of the piping is disposed in a space sandwiched from left and right between the power unit 58 and the PDU 60 (see FIG. 9), when the vehicle is involved in a collision it is possible to protect effectively the first PCSV 15, the second PCSV 16, and part of the piping from damage.

In FIG. 5 in particular, since the first port 24, the second port 25, and the third port 26 of the first PCSV 15 and the first port 24 and the second port 25 of the second PCSV 16 are disposed in a region sandwiched between the line L1 denoting one side face of the bracket 41 and the line L2 joining positions where the first PCSV 15 and the second PCSV 16 are farthest from the line L1 of the bracket 41, it is possible to suppress the depth of the assembly of the bracket 41, the first PCSV 15, and the second PCSV 16, thus enabling it to be disposed in the internal combustion engine in a compact manner. As a result, the amount of projection of the first PCSV 15 and the second PCSV 16 from the internal combustion engine becomes small, thereby decreasing the possibility that the first PCSV 15 and the second PCSV 16 will be damaged when the vehicle is involved in a collision.

Furthermore, in FIG. 4, since the second tube 49 and the third tube 51, which connect the first PCSV 15 and the second PCSV 16, are disposed in a region defined by extension lines of four side faces of the housing 21 of the first PCSV 15 and the second PCSV 16 (a region surrounded by the lines L3, L4, L5, and L6), and the second tube 49 and the third tube 51 are disposed so as to bend back in the first PCSV 15 and then intersect each other, it is possible to dispose the second tube 49 and the third tube 51 in a compact manner in the region sandwiched between the first PCSV 15 and the second PCSV 16, thus reducing the installation space.

In addition, it is also possible to reduce the installation space in the same way even by disposing the second tube 49 and the third tube 51, which connect the first PCSV 15 and the second PCSV 16, in the region defined by the line L6 denoting the extension line of the side face on the lower side of the housing 21 of the first PCSV 15, a line L8 denoting the extension line of the side face on the right side thereof, a line L7 denoting the extension line of the side face on the upper side of the housing 21 of the second PCSV 16, and the line L3 denoting the extension line of the side face on the left side thereof (a region surrounded by the lines L6, L8, L7, and L3 in FIG. 4).

Second Embodiment

Figure 11:
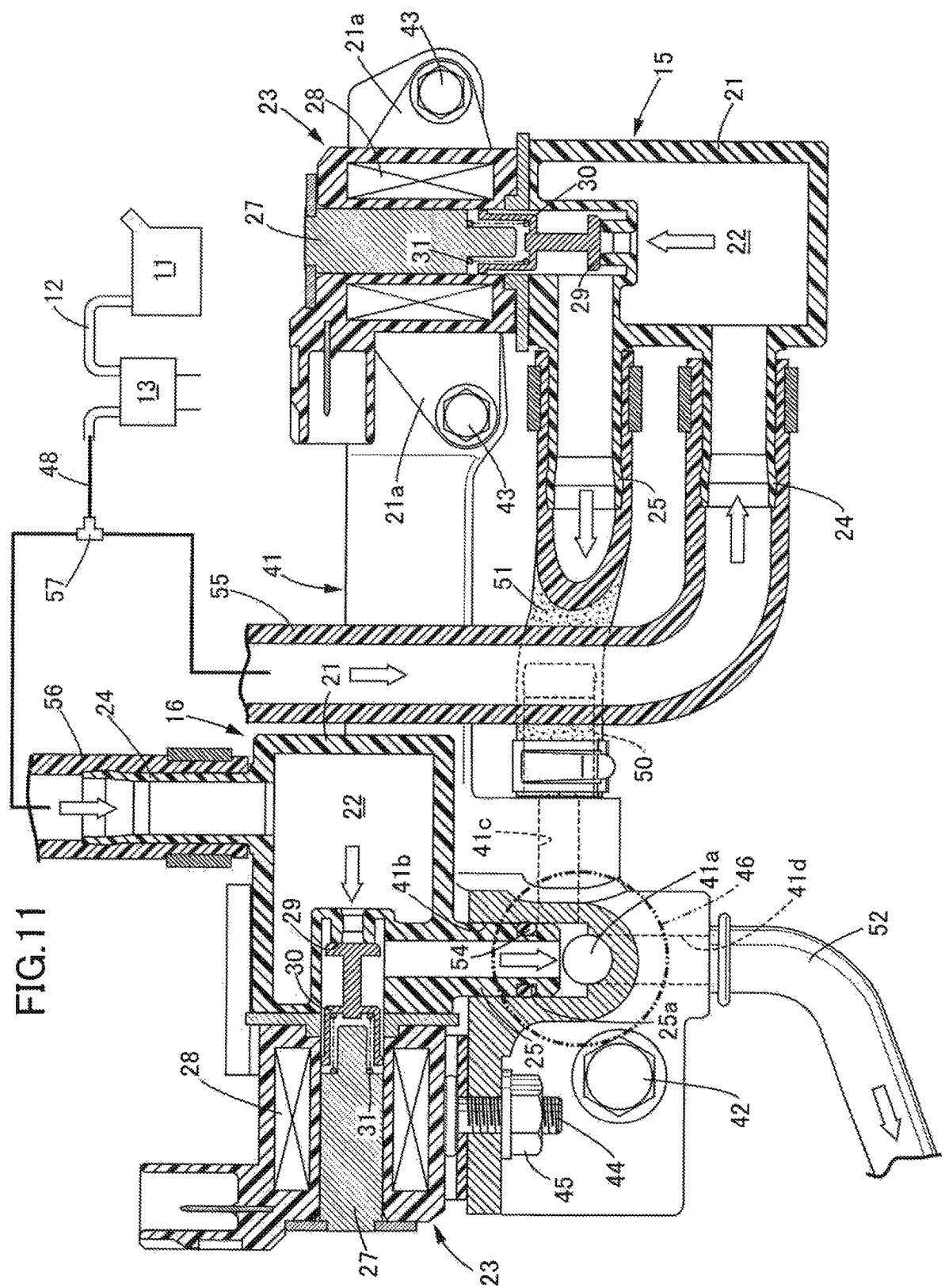
FIG. 11 is a view corresponding to FIG. 6. (second embodiment)

A second embodiment of the present invention is now explained by reference to FIG. 11.

The second PCSV 16 of the first embodiment described above is equipped with the third port 26, but a second PCSV 16 of the second embodiment has the same structure as that of the first PCSV 15 and is not equipped with the third port 26, and the second tube 49 of the first embodiment, which connects the third port 26 of the second PCSV 16 and the first port 24 of the first PCSV 15, is therefore also eliminated. Instead, the first tube 48 extending from the canister 13, the fifth tube 55 extending from first port 24 of the first PCSV 15, and the sixth tube 56 extending from first port 24 of the second PCSV 16 are connected via a trifurcate joint member 57.

In the first embodiment, the function of the trifurcate joint member 57 is imparted to the chamber 22 of the second PCSV 16, but in the present embodiment the special joint member 57 is required, thus accordingly increasing the number of components. The effect of the second embodiment is otherwise the same as the effects of the first embodiment described above.

Third Embodiment

Figure 12:
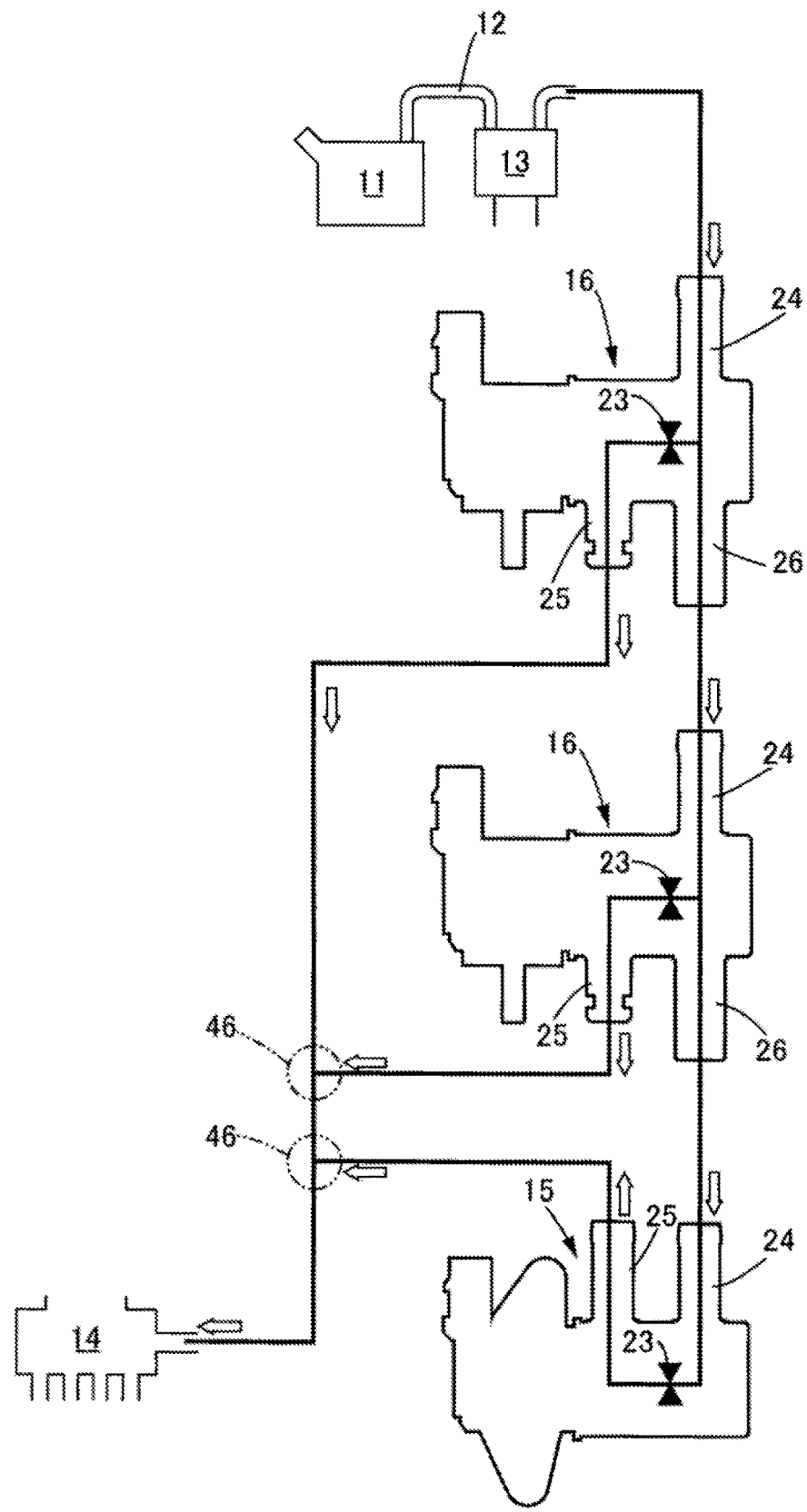
FIG. 12 is a view showing an entire configuration of a purge control system of fuel vapor. (third embodiment)

A third embodiment of the present invention is now explained by reference to FIG. 12. The third embodiment is a modification of the first embodiment, and one more second PCSV 16 is connected in parallel to that of the first embodiment. In accordance with the present embodiment, it is possible to enhance the control precision of the purge flow rate while ensuring that there is a still larger purge flow rate. In addition, the number of second PCSVs 16 added is not limited to one and may be two or more.

Fourth Embodiment

A fourth embodiment of the present invention is now explained by reference to FIG. 13.

The fourth embodiment is a modification of the second embodiment; one more first PCSV 15 (or a second PCSV 16 having the same structure as that of the first PCSV 15) is connected in parallel to that of the second embodiment. In accordance with the present embodiment, it is possible to enhance the control precision of the purge flow rate while ensuring that there is a still larger purge flow rate. In addition, the number of first PCSVs 15 added is not limited to one and may be two or more.

Embodiments of the present invention are explained above, but the present invention may be modified in a variety of ways as long as the modifications do not depart from the gist of the present invention.

For example, the fluid control valve of the present invention is not limited to the PCSV (purge control solenoid valve) of the embodiments and may be a valve with any other function.

What is claimed is:

1. A fluid control device for an internal combustion engine, the fluid control device comprising:
    a plurality of fluid control valves each comprising a chamber, a first port via which fluid is introduced to the chamber, a second port via which fluid is guided out from the chamber, and a solenoid valve part opening and closing the second port with respect to the chamber;
    one support member for supporting and fixing the plurality of fluid control valves to a vehicle; and
    a branched passage having a plurality of inlet portions communicating with the second port of the plurality of fluid control valves and an outlet portion guiding out the fluid introduced from the plurality of inlet portions, the branched passage being formed integrally with an interior of the support member.

2. The fluid control device for an internal combustion engine according to claim 1, wherein at least one of the plurality of fluid control valves comprises a third port guiding out fluid from the chamber, the third port communicating with the first port of another of the plurality of fluid control valves.

3. The fluid control device for an internal combustion engine according to claim 1, wherein at least one of the plurality of fluid control valves comprises an O ring that is fitted into an annular groove formed in an outer periphery of the second port, and the second port is fitted into one of the inlet portions of the branched passage via the O ring.

4. The fluid control device for an internal combustion engine according to claim 3, wherein another of the inlet portions of the branched passage and the outlet portion of the branched passage comprise a joint member.

5. The fluid control device for an internal combustion engine according to claim 3, wherein at least one of the plurality of fluid control valves is fixed to the support member by means of a stud bolt, a center line of the stud bolt being disposed in parallel with a center line of the second port having the O ring.

6. The fluid control device for an internal combustion engine according to claim 2, wherein a housing having the chamber of the fluid control valves formed in an interior of the housing is joined to the solenoid valve part, the solenoid valve part operates in a same direction as a longitudinal direction of the housing, two of the fluid control valves are disposed side by side, when viewed in an operating direction of the solenoid valve part of any one of the fluid control valves the support member extends along a direction in which the two fluid control valves are arranged side by side and holds the fluid control valves, and the first port, the second port, and the third port of the two fluid control valves are disposed within a region sandwiched by the support member and a straight line joining positions where each of the fluid control valves projects farthest from the support member.

7. The fluid control device for an internal combustion engine according to claim 1, wherein the solenoid valve parts of the two fluid control valves have their operating directions orthogonal to each other when viewed from one direction, and when a plane perpendicular to the orthogonal plane is viewed from above the two fluid control valves are disposed side by side, the support member extends along the direction in which the two fluid control valves are arranged side by side and holds the fluid control valves, and piping providing a connection between the two fluid control valves is disposed in a region surrounded by an extension line of a side face, on a side distant from the two fluid control valves, of the housing of the two fluid control valves along the direction in which the two fluid control valves are arranged side by side and an extension line of a side face, on a side distant from the two fluid control valves, of the housing along a direction orthogonal to the direction in which the two fluid control valves are arranged side by side.

8. The fluid control device for an internal combustion engine according to claim 2, wherein the solenoid valve parts of the two fluid control valves have their operating directions orthogonal to each other when viewed from one direction, when a plane perpendicular to the orthogonal plane is viewed from above, the two fluid control valves are disposed side by side, the third port of the one fluid control valve and the first port of the another fluid control valve, which extend in a direction orthogonal to each other, are connected by first piping, the second port of the another fluid control valve is disposed in parallel with the first port on the respective solenoid valve part side with respect to the first port, the second port of the another fluid control valve and the inlet portion of the one fluid control valve are connected by second piping, and the first piping and the second piping intersect each other.

* * * * *